Sept. 6, 1932.　　　T. J. SMULSKI　　　1,875,895
WINDSHIELD WIPER
Original Filed April 24, 1925　　4 Sheets-Sheet 1
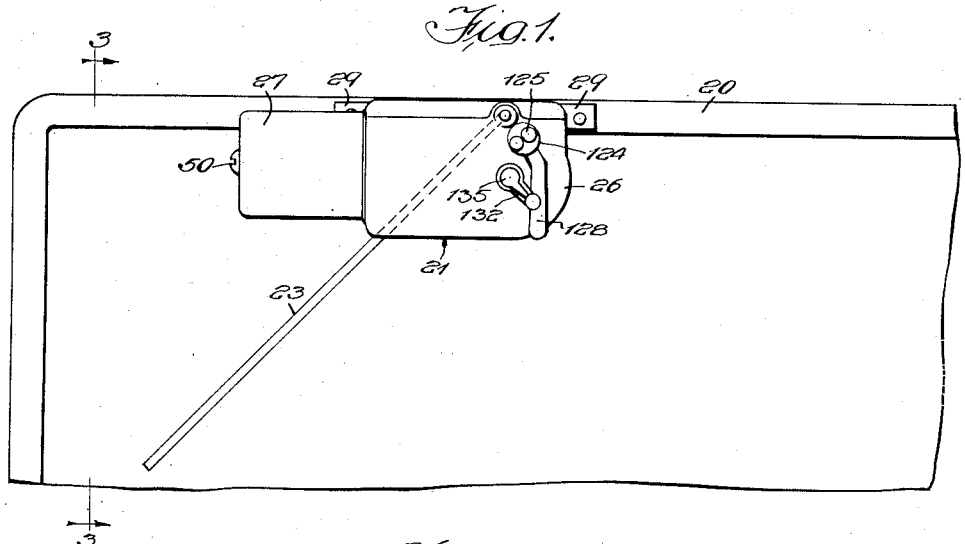
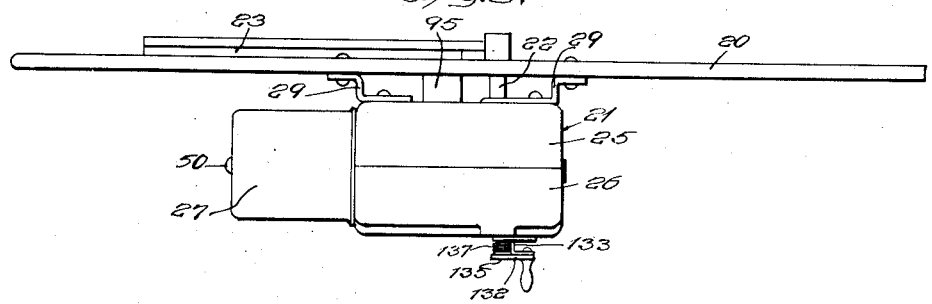
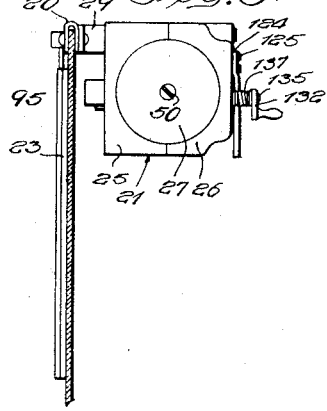

Sept. 6, 1932. T. J. SMULSKI 1,875,895
WINDSHIELD WIPER
Original Filed April 24, 1925 4 Sheets-Sheet 2
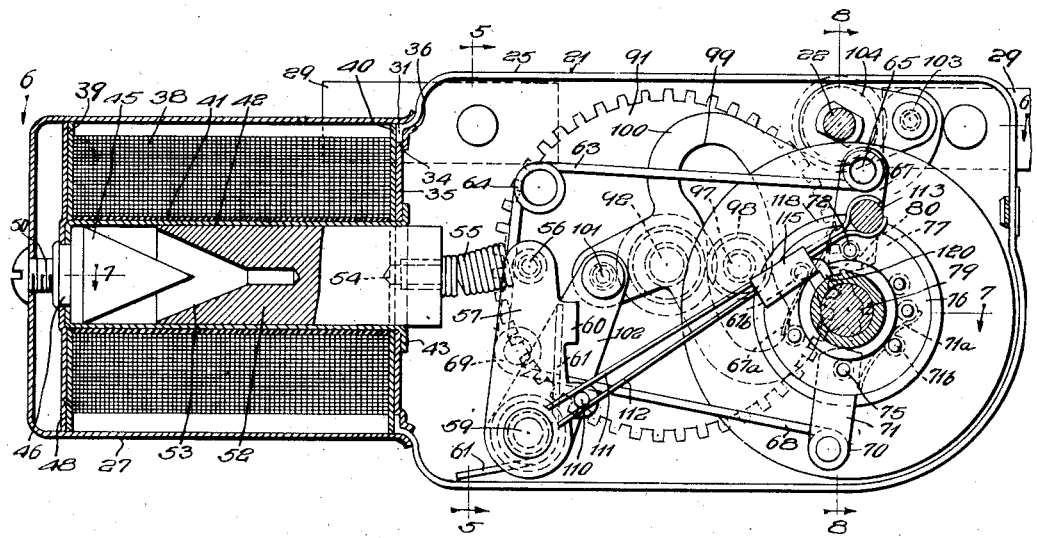
Fig. 4.
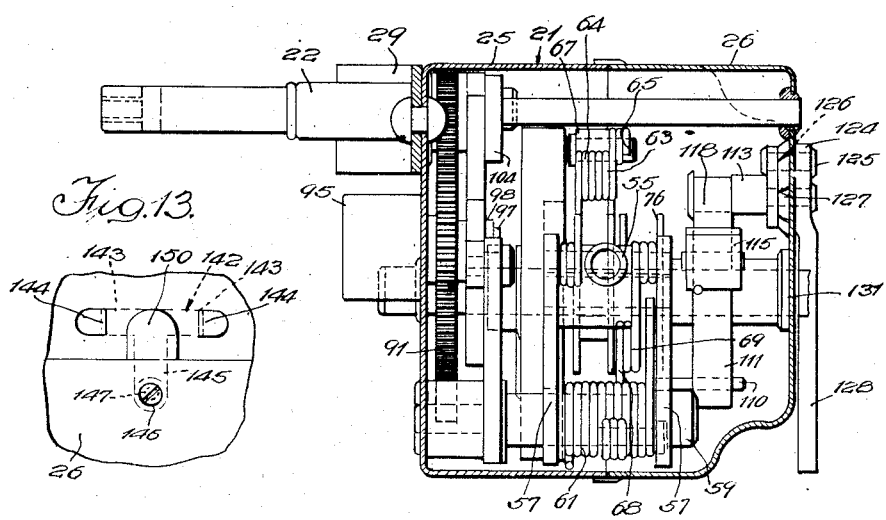
Fig. 5.
Fig. 13.
Witnesses:
William P. Kilroy
Harry C. L. White
Inventor:
Theodore J. Smulski
Hill & Hill Sept. 6, 1932.    T. J. SMULSKI    1,875,895
WINDSHIELD WIPER
Original Filed April 24, 1925    4 Sheets-Sheet 3

Witnesses:
William P. Kilroy
Harry C. White

Inventor:
Theodore J. Smulski
By Hill & Hill
Attys.

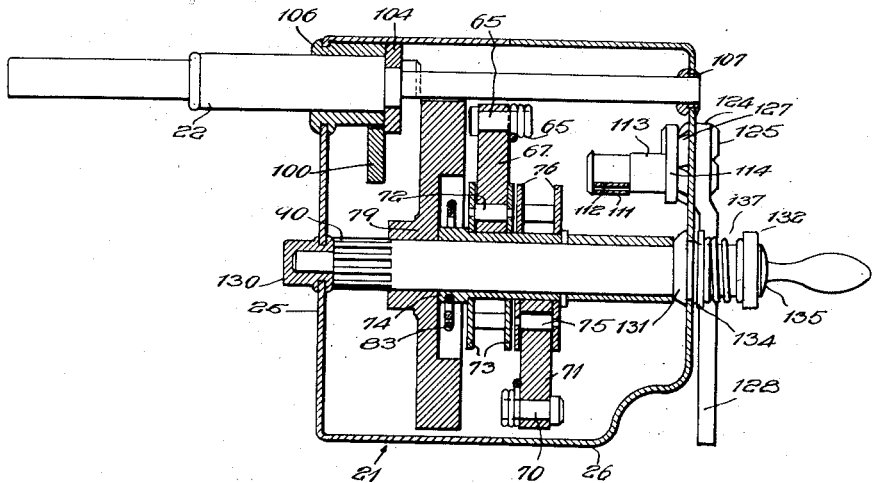
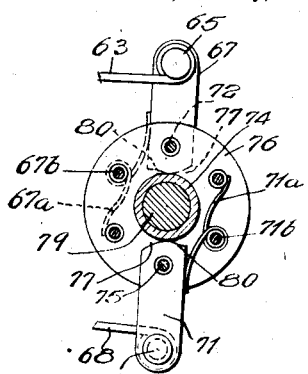
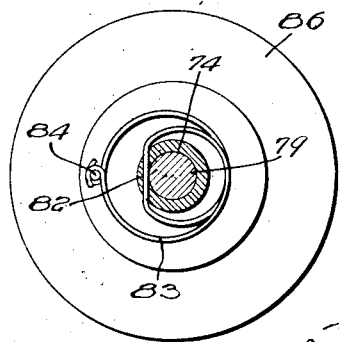
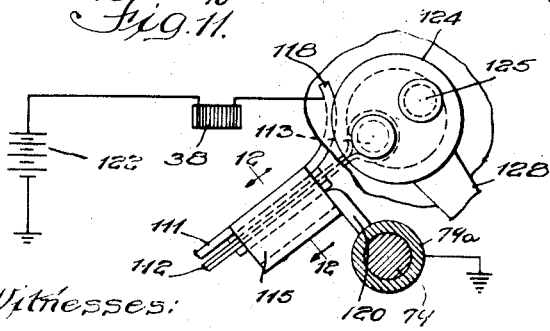

Patented Sept. 6, 1932

1,875,895

UNITED STATES PATENT OFFICE

THEODORE J. SMULSKI, OF LAKE ZURICH, ILLINOIS, ASSIGNOR TO THE ANDERSON CO., OF GARY, INDIANA, A CORPORATION OF INDIANA

WINDSHIELD WIPER

Application filed April 24, 1925, Serial No. 25,532. Renewed December 12, 1931.

My invention relates to an improved windshield wiper and has among its other objects the production of a device of the kind described, which is extremely neat and attractive in appearance, simple, convenient, compact, durable, reliable, efficient and satisfactory for use wherever found applicable. Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is an elevation of a windshield wiper embodying my invention, the windshield wiper being shown in connection with a windshield to which it is secured;

Fig. 2 is a plan view of the improved windshield wiper;

Fig. 3 is a section taken on line 3—3 of Fig. 1, the windshield wiper being shown in elevation;

Fig. 4 is a longitudinal section taken through the improved windshield wiper;

Figure 7:
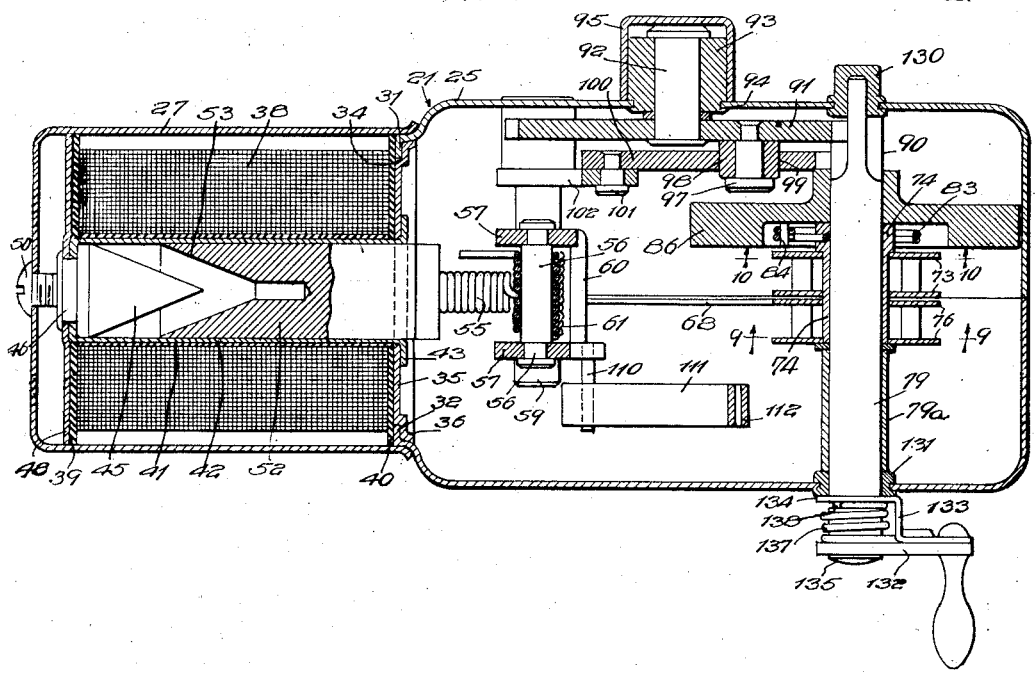

Figs. 5, 6, 7 and 8 are sections taken on lines 5—5, 6—6, 7—7 and 8—8, respectively, of Fig. 4;

Figs. 9 and 10 are sections taken on lines 9—9 and 10—10, respectively, of Fig. 7;

Fig. 11 is an enlarged fragmentary elevation of mechanism for closing and opening an electrical circuit forming a part of my improved windshield cleaner, the electrical circuit being shown diagrammatically;

Fig. 12 is a section taken on line 12—12 of Fig. 11; and

Fig. 13 is a fragmentary elevation of a portion of the housing wherein the operating mechanism of my improved windshield cleaner is preferably mounted.

Referring for the present to Figs. 1, 2 and 3, my improved windshield wiper is shown in connection with a windshield 20. The windshield wiper preferably comprises a housing 21 mounted in this instance upon the inner side of the windshield. Projecting from the housing 21 is a shaft 22 which may be oscillated to drive a squeegee 23 or the equivalent, the squeegee 23 being disposed on the outer side of the windshield. While this is a preferred arrangement, it will become apparent as this description progresses that the housing 21 may also be mounted upon the outer side of the windshield and that I am limited to the arrangement shown only insofar as defined in the appended claims.

The housing 21 preferably comprises complementary members 25 and 26 and a substantially cylindrical member 27, a pair of brackets 29 being secured to the member 25 to mount the housing upon the windshield. As shown in Figs. 4 and 7, the member 26 forms a cap or cover for the member 25. Inwardly extending flanges 31 and 32, respectively, formed on the members 25 and 26 are adapted to be inserted in the member 27. The flanges 31 and 32 encircle an annular shoulder 34 formed upon a disk 35, the disk 35 being provided with an offset annular flange 36 adapted to engage the inner surfaces of the flanges 31 and 32. This construction permits the flanges 31 and 32 to be clamped between the annular flange 36 and the member 27, so that the members 25 and 26 will be held against displacement relative to each other.

In this embodiment of the invention I prefer to oscillate the shaft 22 by means comprising a solenoid 38 or the equivalent disposed within the member 27. The solenoid 38 comprises a winding which is disposed intermediate two insulating disks 39 and 40 and is wound upon an insulating sleeve 41. The insulating sleeve 41 is preferably mounted upon a tubular member 42 which projects through a central aperture formed in the disk 35, the tubular member being provided with an outwardly extending annular flange 43 resting against the disk 35. Seated in the tubular member 42 is a pole-piece 45 having an extension 46 which projects through apertures formed in the tubular member and in a disk 48. The outer end of the extension 46 is riveted over to secure the pole-piece 45 to the tubular member 42 and to secure the tubular member 42 and the disk 48 to each other. Threaded into the extension 46 is a screw 50, the head of which is adapted to engage the outer surface of the member 27. Obviously, the screw 50 may be employed to draw the tubular member 42 toward the left (Fig. 4) to clamp the flanges 31 and 32 between the disk 35 and the member 27.

In assembling the apparatus the disk 35 is first positioned correctly upon the tubular member 42 after which the solenoid 38 and the disk 39 are positioned thereon. The pole-piece 45 is then inserted in the tubular member 42 and the extension 46 is riveted over to hold the several parts mounted on the tubular member 42 in their assembled positions. The members 25 and 26 are then brought into positions wherein the flanges 31 and 32 rest upon the annular shoulder 34. The cylindrical member 27 is then placed over the solenoid 38 and the screw 50 is threaded into the pole-piece 45, the screw being manipulated to draw the member 27 and the disk 35 toward each other to rigidly secure the flanges 31 and 32 between them. It is readily understood that the members 25 and 26 are then secured against displacement relative to the other.

Slidably mounted in the tubular member 42 is a core 52 having a depression 53 conforming to the shape of the pole-piece 45. This construction insures efficient operation of the solenoid 38. Secured to the core 52 by a screw 54 or the equivalent is a spring 55 which is also secured to a pin 56, the pin 56 being mounted in the free ends of a pair of arms 57 pivoted upon a pin 59 projecting from the inner surface of the member 25. Formed integral with the arms 57 is a bar 60 against which rests one end of a spring 61, the spring 61 being wound around the pin 59 and having its other end resting against the inner surface of the member 25. The spring 61 tends to rotate the arms 57 in a clockwise direction (Fig. 4). Wound around the pin 56 is one end of a spring 63 which is coiled intermediate its ends as at 64 and has its other end wound around a pin 65 projecting from a dog 67. Also wound around the pin 56 is one end of a spring 68 which is coiled intermediate its ends at 69 and has its other end wound around a pin 70 projecting from a dog 71. The springs 63 and 68 form yielding means operatively connecting the pin 56 with the pins 65 and 70. The dog 67 is pivotally mounted intermediate its ends upon a pin 72 mounted in a pair of collars 73 which are rotatably journaled upon a sleeve 74, the sleeve 74 being journaled upon a shaft 79. The dog 71 is pivotally mounted intermediate its ends upon a pin 75 mounted in a pair of collars 76 which are rotatably journaled upon the sleeve 74. Each of the dogs 67 and 71 are provided with arcuate surfaces 77 adapted to frictionally engage the sleeve 74 when the dogs are urged in clockwise directions (Fig. 4) around the axes of their respective pins 72 and 75. Each dog 67 and 71 is also notched as at 80 so that the dogs will be disengaged from the sleeve 74 if they are rotated in counter-clockwise directions (Fig. 4) around the axes of their respective pins 72 and 75 to present the notches 80 to the sleeve.

The above described apparatus is so designed that if the solenoid 38 is energized to attract the core 52, the pin 56 will be rotated in a counter-clockwise direction (Fig. 4) around the axis of the pin 59, the pin 56 being connected to the core 52 by the spring 55. This displacement of the pin 56 causes the dog 67 to be rotated bodily in a counter-clockwise direction (Fig. 4) around the axis of the shaft 79 and causes the dog 71 to be rotated in a clockwise direction (Fig. 4) around the axis of the shaft 79, the motion of the pin 56 being transmitted to the dogs 67 and 71 by the springs 63 and 68, respectively. When the dog 71 is so displaced its arcuate surface 77 drives the sleeve 74 around the axis of the shaft 79. At the same time the dog 67 slips over the sleeve 74. If the solenoid 38 is de-energized after its core 52 has been brought into close proximity to the pole-piece 45 the spring 61 will act to restore the pin 56 to the position wherein it is shown in Fig. 4, the spring 55 functioning simultaneously to restore the core 52 to the position wherein it is shown in the same figure. During this movement of the pin 56 action of the dogs 67 and 71 is reversed and the dog 67 frictionally engages the sleeve 74 and rotates it in a clockwise direction (Fig. 4) while the dog 71 slips over the sleeve. This construction permits the sleeve 74 to be driven intermittently in a clockwise direction (Figs. 4 and 9). Means is provided for normally holding the arcuate surfaces 77 in engagement with the sleeve 74 (Fig. 9). Thus the dog 67 is yieldingly urged in a clockwise direction (Fig. 9) around the pin 72 by a spring 67a mounted upon a pin 67b, which is carried by the collars 73 and the dog 71 is urged in the same direction around the pin 75 by a spring 71a mounted upon a pin 71b which is carried by the collars 76. This construction insures that there will be no lost motion between the dogs 67 and 71 and the sleeve 74.

As best shown in Fig. 10, the sleeve 74 is slotted as at 82 to receive a spring 83, the spring 83 being wound around the sleeve and the ends thereof being hooked over a pin 84 projecting from a fly-wheel 86 secured to the shaft 79. The construction is such that if the sleeve 74 is rotated in a clockwise direction (Fig. 10), the spring 83 will yieldingly urge the fly-wheel 86 and the shaft 79 in the same direction. If the shaft 79 and the fly-wheel 86 are driven in a clock-wise direction (Fig. 10) by means hereinafter described the spring 83 will yieldingly urge the sleeve 74 in a like direction. The purpose of this construction will presently appear.

Formed integral with the shaft 79 is a pinion 90 which meshes with a gear 91 fixed upon a stud shaft 92 which is journaled in a bearing block 93 secured in an aperture 94 formed in the member 25. The ends of the shaft 92 are enlarged or riveted over to hold the shaft and the gear in their assembled positions. The outer end of the shaft 92 and the bearing block 93 are preferably enclosed within a cap 95 which excludes dust and the like from the bearing. Projecting from the gear 91 is a pin 97 carrying an anti-friction roller 98 which rides in a cam slot 99 formed in a link 100. One end of the link 100 is pivotally connected by a pin 101 to a lever 102 pivotally mounted upon the pin 59. The other end of the link 100 is pivotally secured by a pin 103 to the free end of a lever 104 rigidly secured to the aforementioned shaft 22. The construction is such that if the gear 91 is rotated the anti-friction roller 98 will impart a substantially reciprocatory motion to the link 100 and cause it to oscillate the shaft 22 through the medium of the lever 104. The cam slot 99 is so designed that the squeegee 23 will be moved from either one of its extreme positions to the other at a substantially uniform speed.

The shaft 22 is preferably journaled in a bearing block 106 riveted to the member 25 and in a bearing block 107 riveted to the member 26. If the housing 21 is to be mounted upon the outer side of the windshield 20 the shaft 22 may be readily replaced by a shorter shaft.

Projecting from one of the arms 57 is a pin 110 which is disposed intermediate the free ends of a pair of leaf springs 111 and 112, the other ends of the leaf springs being clamped to a pin 113 projecting from a disk 114. The means for clamping the springs 111 and 112 to the pin 113 comprises a metallic clip 115 which is electrically insulated from the springs 111 and 112 by a sleeve 116. The clip 115 is provided with an extension 118 to which one end of an electrical conductor may be secured. Carried by the clip 115 and making electrical contact therewith is a contacting member 120 which will be brought into and out of engagement with a sleeve 79a mounted upon the shaft 79 when the arms 57 are oscillated about the axis of the pin 59. The use of the springs 111 and 112 to operatively connect the pin 110 with the contacting member 120 insures that the contacting member will properly engage the sleeve 79a, the arrangement being such that the spring 112 is deformed to urge the contacting member against the sleeve when the arms 57 are in the positions wherein they are shown in Fig. 4. In Fig. 11 I have diagrammatically illustrated a circuit which includes the contacting member 120 and the solenoid 38. The sleeve 79a is grounded in the usual manner and the extension 118 is connected to one terminal of the winding of the solenoid 38, the other terminal of the winding being connected to one terminal of a storage battery 122 or the equivalent. The other terminal of the storage battery is grounded. The operation of this apparatus is described hereinafter.

The disk 114 is positioned within the member 26 and is secured to a disk 124 disposed on the outer side of the member 26, the disks 114 and 124 being secured to each other by the pin 113 and a pin 125. A bearing aperture 126 is provided in the member 26 for the disks 114 and 124, the construction being such that the disks 114 and 124 may be rotated around an axis spaced from the axis of the pin 113. The disks 114 and 124 are held against accidental displacement relative to the member 26 by a spring washer 127 interposed between the disk 114 and the member 26. A lever 128 formed integral with the disk 124 may be employed to rotate the disks to bring the pin 113 and the contacting member 120 into a plurality of adjusted positions with respect to the sleeve 79a. This permits the operator to control the speed at which the apparatus operates and also permits him to bring the contacting member 120 into a position wherein it cannot engage the sleeve 79a. For example, if the discs 114 and 124 carrying the pin 113 are rotated in a clockwise direction (Fig. 11) far enough to position the contacting member 120 out of engagement with the sleeve 79a when the pin 110 is in its furthermost position to the right (Fig. 4), no contact will be established and no current will flow through the circuit to energize the solenoid 38. In this condition, the wiper may remain at rest or may be actuated manually by the crank 132 (Fig. 1). If the discs 114 and 124 are now moved in a counter clockwise direction (Fig. 11) to position the pin 113 nearer the sleeve 79a and the contacting member 120 just barely in engagement with the sleeve 79a in a manner to place only a slight tension on the leaf spring 112, the solenoid will be energized and the arms 57 carrying the pin 110 will be moved in a counter clockwise direction (Fig. 4), thereby slightly tensioning the spring 61 and causing the pin 110 to engage the leaf spring 111.

Owing to the slight tension of the leaf spring 112 and the correspondingly light pressure of the contact member 120 on the sleeve 79a, the engagement of the pin 110 with the leaf spring 111 will almost immediately move the contact member 120 out of engagement with the sleeve 79a, thereby deenergizing the solenoid and permitting the arms 57 to return to their furthermost position to the right (Fig. 4) due to the force exerted by the spring 61, thus permitting the member 120 to again engage the sleeve 79a for energizing the solenoid 38, and following the slight movement of the core 52 to the left within the solenoid, and an equally slight counter clockwise movement of the arms 57, the circuit will again be broken and the arms 57 returned to their normal position by the action of the spring 61. It will be observed that by such an arrangement, the electrical impulse is of short duration and only a slight oscillatory movement of the arms 57 is produced, thus causing the surfaces 77 of the dogs 67 and 71 to engage the sleeve 74 for correspondingly short periods of time for driving the shaft 22 at substantially minimum speed.

Assuming now that from the position just described, the discs 114 and 124 are rotated a substantial distance further in a counter clockwise direction (Fig. 11) and in a manner to position the pin 113 an appreciable distance closer to the sleeve 79a, thus applying greater pressure of the member 120 on the sleeve 79a, a contact will be established between the member 120 and the sleeve to energize the solenoid and move the arms 57 in a counter clockwise direction as above described, but owing to the changed position of the pin 113 with respect to the sleeve 79a, the pin 110 is required to travel a greater distance in a counter clockwise direction before its engagement with the leaf spring 111 will move the contact member 120 out of engagement with the sleeve 79a to break the circuit, thus providing an electrical impulse of longer duration and of greater value for actuating the dog 71 and for tensioning the spring 61 to a greater degree, and after the contact between the member 120 and sleeve 79a has been broken, the energy stored in the spring 61 will rotate the arms 57 and pin 110 about the shaft 59 a correspondingly greater distance in a clockwise direction to actuate the dog 67 and to restore the pin 110 to substantially its initial position, and in so doing, will cause the member 120 to again engage the sleeve 79a under tension of the leaf spring 112. It will be observed that with the pin 113 in the position just described, namely, in closer proximity to the sleeve 79a, the arms 57 will be moved through a greater arc in a counter clockwise direction, and a correspondingly greater distance in the opposite direction than when the pin 113 is further removed from the sleeve 79a, and it will be further observed that by reason of the greater continued movement of the arms 57 in one direction or another, the surfaces 77 of the dogs 67 and 71 will remain in effective or driving engagement with the sleeve 74 for a longer period of time, thereby producing a greater driving effect on the shaft 79 and pinion 90, thus increasing their speed of rotation and, by reason of the connections described, increasing the oscillatory speed of the shaft 22.

One end of the shaft 79 is preferably journalled in a bearing block 130 riveted in an aperture formed in the member 25. The other end of the shaft 79 projects through a bearing block 131 riveted in an aperture formed in the member 26. Rotatably journalled upon the shaft 79 is a crank 132. A bracket member 133 secured to the crank 132 is provided with an offset extension 134 also rotatably journaled upon the shaft 79. A spring 137 wound around the shaft 79 has one of its ends secured between the bracket 133 and the crank 132, the other end of the spring 137 being disposed in an annular groove 138 formed in the shaft 79. This engagement of the spring 137 with the groove 138 yieldingly prevents withdrawal of the crank 132 from the shaft 79. The spring 137 is so wound around the shaft 79 that if the crank 132 is rotated in a clock-wise direction (Fig. 1) the spring will frictionally engage the shaft and rotate it in a like direction; but if the crank is rotated in a counter-clockwise direction (Fig. 1), the spring 137 will not seize the shaft and the shaft will not revolve.

Figure 6:
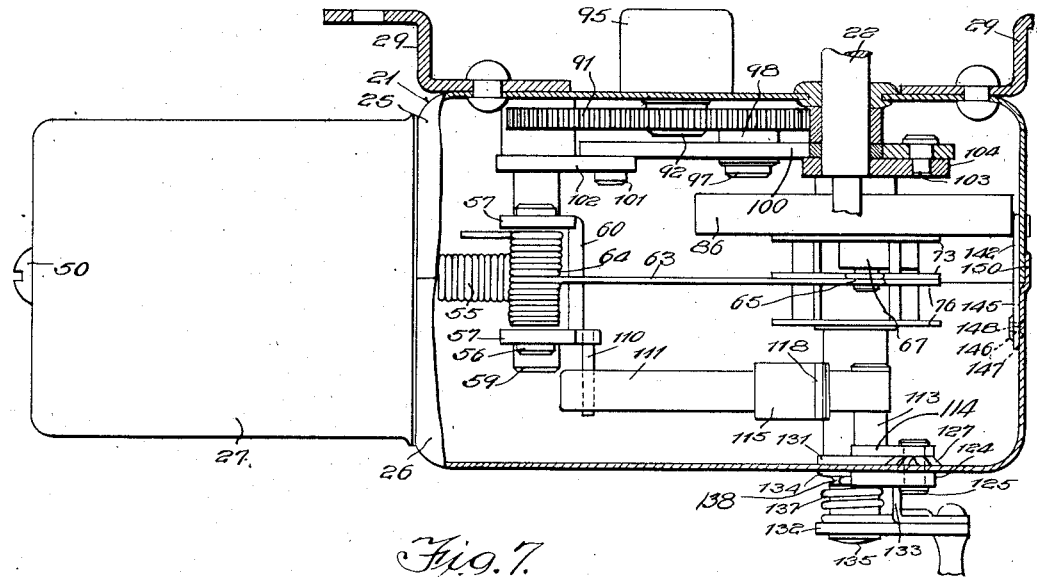

As shown most clearly in Figs. 6, 7 and 13, I provide means for securing the members 25 and 26 to each other, which means may be used in addition to the means hereinbefore described for holding the members against displacement relative to each other. The additional means comprises a T-shaped member 142 having a pair of oppositely disposed arms 143 adapted to be secured in apertures 144 provided in the member 25. This construction rigidly secures the T-shaped member 142 to the member 25. The member 142 is provided with a third arm 145 having a threaded aperture 146 aligned with an aperture 147 provided in the member 26. A screw 148 passing through the aperture 147 and threadedly engaging the aperture 146 cooperates with the member 142 to secure the members 25 and 26 to each other. In some instances I prefer to provide the member 26 with an offset lug 150 adapted to engage the outer surface of the member 25. This prevents longitudinal displacement of the members relative to each other.

If the pin 113 is brought approximately into the position where it is shown in Fig. 11, the apparatus will operate substantially as follows: An electrical current will pass from the battery 122 through the solenoid 38, the extension 118, the clip 115, the contacting member 120 and through the shaft 79 back to the battery through ground. The solenoid 38 will then become energized and its core 52 will be drawn toward the pole-piece 45. This displacement of the core 52 causes the arms 57 to be rotated in a counter-clockwise direction (Fig. 4) against the action of the spring 61. When the arms 57 are rotated in a counter-clockwise direction (Fig. 4) the spring 68 will be caused to rotate the dog 71 bodily around the axis of the shaft 79 in a clockwise direction (Fig. 4) whereupon the dog 71 will frictionally engage the sleeve 74 and drive the shaft 79 through the medium of the spring 83 and the fly-wheel 86. Rotation of the shaft 79 will cause the pinion 90 to drive the gear 91 and the anti-friction roller 98 will displace the link 100 in such manner that the lever 104 will be rotated in a clockwise direction (Fig. 4). As the lever 104 and the squeegee 23 are both secured to the shaft 22 the squeegee will be drawn across the windshield 20 in the same direction. When the core 52 approaches the pole-piece 45, the pin 110 will raise the free ends of the springs 111 and 112 to bring the contacting member 120 out of engagement with the sleeve 79a. The solenoid 38 will then become deenergized and the spring 61 will restore the arms 57 and the core 52 to positions wherein they are shown in Fig. 4. This movement of the arms 57 will cause the spring 63 to rotate the dog 67 bodily around the axis of the shaft 79 in a clockwise direction (Fig. 4). When so rotated the dog 67 will drive the sleeve 74 in a like direction and cause the sleeve to drive the shaft 79 in the same direction through the medium of the spring 83. The pinion 90 will continue to drive the gear 91 and the above described sequence of operations will be repeated until the pin 113 is manually displaced into a position wherein the contacting member 120 cannot engage the shaft 79. The gear 91 will be continuously driven in a counter clockwise direction (Fig. 4) and the squeegee 23 will be oscillated around the axis of the shaft 22 to wipe the windshield 20, it being understood that the contacting member 120 will engage the sleeve 79a each time the arms 57 return to the position wherein they are shown in Fig. 4. The fly-wheel 86 insures a smooth action of the apparatus and the spring 83 cushions the apparatus against the vibratory action of the solenoid. The core is reciprocated a plurality of times for each stroke of the squeegee.

The apparatus may be manually operated by means of the crank 132, which may be rotated as above described in a clock-wise direction (Fig. 1) to rotate the shaft 79 in the same direction. The pinion 90 will then drive the gear 91 and the link 100 will be reciprocated to oscillate the squeegee 23. The spring 83 will yieldingly urge the fly-wheel 86 and the sleeve 74 in the same direction, the spring 83 being arranged so that it will not unwind when the fly-wheel 86 is driven by the shaft 79.

As hereinbefore mentioned, the pin 113 may be brought into a position wherein the contacting member 120 will be held in a position where it cannot engage the shaft 79. The contacting member 120 is brought into the latter position when the apparatus is to be operated by means of the crank 132 or when the apparatus is not to be used. The speed of the apparatus may be regulated by moving the pin 113 toward or away from the shaft 79 so that the contacting member 120 will engage the shaft 79 for a longer or shorter period of time, respectively, during each cycle of operation.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. Driving apparatus comprising a solenoid having a reciprocatory core, a rotatably mounted member having a substantially cylindrical surface, an element arranged to frictionally engage said cylindrical surface, means for mounting said element whereby it may oscillate bodily around the axis of rotation, means operatively connecting said core to said element whereby said element effectively frictionally engages and advances said member during alternate strokes of said core, a second element arranged to frictionally engage said member, means for mounting said second element whereby it may oscillate bodily around the axis of rotation of said member, means actuated by the core for bringing said second element into effective frictional engagement with said member to advance it when it is not being advanced by the first-mentioned element, and means for maintaining the rotary motion of said member when said elements are not in motion, so that said rotary motion is substantially continuous.

2. Driving apparatus comprising a solenoid having a reciprocatory core, a rotatably mounted member having a substantially cylindrical surface, an element arranged to frictionally engage said cylindrical surface, means for mounting said element whereby it may oscillate bodily around the axis of rotation, means operatively connecting said core to said element whereby said element effectively frictionally engages and advances said member during alternate strokes of said core, means actuated by said solenoid for controlling the operation of the solenoid, and means for maintaining the rotary motion of said member when said elements are not in motion, so that said rotary motion is substantially continuous.

3. Driving apparatus comprising a solenoid having a reciprocatory core, a rotatably mounted member having a substantially cylindrical surface, an element arranged to frictionally engage said cylindrical surface, means for mounting said element whereby it may oscillate bodily around the axis of rotation, means operatively connecting said core to said element whereby said element frictionally and effectively engages and advances said member during alternate strokes of said core, a second element arranged to frictionally engage said member, means for mounting said second element whereby it may oscillate bodily around the axis of rotation of said member, means actuated by the core for bringing said second element into frictional engagement with said member to advance it when it is not being advanced by the first-mentioned element, and means actuated by said solenoid for controlling the operation of the solenoid.

4. Driving apparatus comprising a solenoid having a reciprocatory core, a rotatably mounted member having a substantially cylindrical surface, an element arranged to frictionally engage said cylindrical surface, means for mounting said element whereby it may oscillate bodily around the axis of rotation, means operatively connecting said core to said element whereby said element effectively frictionally engages and advances said member during alternate strokes of said core, a second element arranged to frictionally engage the cylindrical surface of said member, means for mounting said second element whereby said second element may oscillate bodily around the axis of rotation of said member, and means including a spring tensioned by the core for bringing said second element into effective frictional engagement with said member to advance it.

5. Driving apparatus comprising a solenoid having a reciprocatory core, a rotatably mounted member having a substantially cylindrical surface, an element arranged to frictionally engage said cylindrical surface, means for mounting said element whereby it may oscillate bodily around the axis of rotation, means operatively connecting said core to said element whereby said element frictionally engages and advances said member during alternate strokes of said core, a second element arranged to frictionally engage said cylindrical surface, means for mounting said second element whereby it may oscillate bodily around the axis of rotation of said member, a spring, means actuated by the core for tensioning the spring, and means operatively connecting the spring with said second element for bringing it into effective frictional engagement with said member to advance it during alternate strokes of the core.

6. Driving apparatus comprising a solenoid having a reciprocatory core, a spring, means operatively connecting the spring to the core whereby the core tensions the spring, a rotatably mounted member, means actuated by the core for intermittently rotating said rotatable member, means actuated by the spring for intermittently rotating the rotatable member, a fly wheel, and means including resilient means for operatively connecting the fly wheel to said rotatable member.

7. Driving apparatus comprising a solenoid having a reciprocatory core, a spring, means operatively connecting the spring to the core whereby the core tensions the spring, a rotatably mounted member, means actuated by the core for intermittently rotating said rotatable member, means actuated by the spring for intermittently rotating the rotatable member, a fly wheel, means including resilient means for operatively connecting the fly wheel to said rotatable member, a pivotally mounted member, and means actuated by the fly wheel for oscillating said pivotally mounted member.

8. Driving apparatus comprising a solenoid having a reciprocatory core, a spring, means operatively connecting the spring to the core whereby the core tensions the spring, a rotatably mounted member, means actuated by the core for intermittently rotating said rotatable member, means actuated by the spring for intermittently rotating the rotatable member, a pivotally mounted member, and means driven by said rotatable member for imparting oscillatory motion to said pivotally mounted member.

9. Driving apparatus comprising a solenoid having a reciprocatory core, a spring, means operatively connecting the spring to the core whereby the core tensions the spring, a rotatably mounted member, means actuated by the core for intermittently rotating said rotatable member, means actuated by the spring for intermittently rotating the rotatable member, a pivotally mounted member, means driven by said rotatable member for imparting oscillatory motion to said pivotally mounted member, and manually operable means for rotating said rotatable member.

10. Driving apparatus comprising a solenoid having a reciprocatory core, a rotatably mounted member having a substantially cylindrical surface, an element arranged to frictionally engage said cylindrical surface, means for mounting said element whereby it may oscillate bodily around the axis of rotation, means operatively connecting said core to said element whereby said element frictionally and effectively engages and advances said member during alternate strokes of said core, a second element arranged to frictionally engage said member, means for mounting said second element whereby it may oscillate bodily around the axis of rotation of said member, means actuated by the core for bringing said second element into frictional engagement with said member to advance it when it is not being advanced by the first-mentioned element, means actuated by said solenoid for controlling the operation of the solenoid, and means for maintaining the rotary motion of said member when said elements are not in motion, so that said rotary motion is substantially continuous.

11. In a device of the class described, a reciprocating member, a rotary member, a pair of members pivotally mounted and adapted to be oscillated bodily about the axis of said rotary member, a pair of springs for transmitting motion to said pair of members from said reciprocating member on the alternate strokes thereof, one of said pair of members acting alternately to frictionally engage and rotate said rotary member while the other slides ineffectually thereon.

12. In a device of the class described, an electrically controlled reciprocating member, a rotary member, means for transmitting motion from said reciprocating member to said rotary member, and an electric circuit controlling said reciprocating member, said circuit including said rotary member, and means controlled by said reciprocating member for periodically contacting with said rotary member and closing said circuit.

13. In a device of the class described, an electrically controlled reciprocating member, a rotary member, means for transmitting motion from said reciprocating member to said rotary member, and an electric circuit controlling said reciprocating member, said circuit including said rotary member, means controlled by said reciprocating member for periodically contacting with said rotary member and closing said circuit, and means for varying the speed of said device at the will of an operator by varying the period of said contact.

14. In a device of the class described, a reciprocating member, a rotary member, a pair of members pivotally mounted and adapted to be oscillated bodily about the axis of said rotary member, a pair of resilient members for transmitting motion to said pair of pivotally mounted members from said reciprocating member on the alternate strokes thereof, each of said pivotally mounted members acting alternately with the other to frictionally engage and rotate said rotary member while the other slides ineffectually thereon.

15. In a device of the class described, a rotary member having driving means mounted thereon and positioned eccentrically to the axis thereof, a rocking member having a cam slot therein adapted to receive said driving means, and a pivoted member operatively related to said rocking member in a manner to receive an oscillatory motion therefrom when said rotary member and driving means are actuated.

16. Driving apparatus comprising an electromagnet, a reciprocal member actuated thereby, a spring, means operatively connecting the spring to said member whereby the member tensions the spring, a rotatably mounted member, means actuated by the reciprocal member for intermittently rotating said rotatable member, means actuated by the spring for intermittently rotating the rotatable member, a pivotally mounted arm, and means driven by said rotatable member for imparting oscillatory motion to said pivotally mounted arm.

17. In a driving apparatus for windshield wipers, an electromagnet, a reciprocal member actuated thereby in one direction, a resilient member operatively related to said reciprocal member in a manner to be energized thereby when said electromagnet is energized and said reciprocal member is moved in said one direction, said resilient member being adapted to move said reciprocal member in the opposite direction when said electromagnet is deenergized, a rotatable member, a pair of dogs adapted to alternately engage said rotatable member, means for connecting said dogs to said reciprocal member for driving said rotatable member with the respective movements of said reciprocal member, a windshield wiper, and means for operatively connecting said wiper and said rotatable member.

18. In a driving apparatus for windshield wipers, an electromagnet, a reciprocal member actuated thereby in one direction, a resilient member operatively relatedly to said reciprocal member in a manner to be energized thereby when said electromagnet is energized and said reciprocal member is moved in said one direction, said resilient member being adapted to move said reciprocal member in the opposite direction when said electromagnet is deenergized, a rotatable member, a pair of dogs adapted to alternately and frictionally engage said rotary member, means for connecting said dogs to said reciprocal member for driving said rotatable member in one direction with the respective movements of said reciprocal member, a windshield wiper, and means for operatively connecting said wiper and said rotatable member.

19. In a driving apparatus for windshield wipers, an electromagnet, a reciprocal member actuated thereby in one direction, a resilient member operatively related to said reciprocal member in a manner to be energized thereby when said electromagnet is energized and said reciprocal member is moved in said one direction, said resilient member being adapted to move said reciprocal member in the opposite direction when said electromagnet is deenergized, a rotatable member, a pair of dogs adapted to alternately and frictionally engage said rotary member, means for connecting said dogs to said reciprocal member and in operative relationship with said resilient member for driving said rotary member in one direction with the respective movements of said reciprocal member, a windshield wiper, and means for operatively connecting said wiper and said rotatable member.

In testimony whereof, I have hereunto signed my name.

THEODORE J. SMULSKI.